United States Patent
Moreau et al.

(10) Patent No.: US 10,778,622 B2
(45) Date of Patent: *Sep. 15, 2020

(54) MODIFYING RICH MEDIA COMPONENTS FOR AN INTERACTIVE EMAIL

(71) Applicant: ADOBE INC., San Jose, CA (US)

(72) Inventors: Stephane Moreau, L'Hay les Roses (FR); Sachin Soni, New Delhi (IN); Ashish Duggal, Delhi (IN); Anmol Dhawan, Ghaziabad (IN)

(73) Assignee: ADOBE INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/689,621

(22) Filed: Aug. 29, 2017

(65) Prior Publication Data
US 2017/0359287 A1    Dec. 14, 2017

Related U.S. Application Data

(63) Continuation of application No. 14/706,051, filed on May 7, 2015, now Pat. No. 9,794,205.

(51) Int. Cl.
| | |
|---|---|
| *H04L 12/58* | (2006.01) |
| *G06F 3/0484* | (2013.01) |
| *G06F 7/08* | (2006.01) |
| *G06F 3/0481* | (2013.01) |
| *G06F 40/134* | (2020.01) |
| *G06F 3/16* | (2006.01) |

(52) U.S. Cl.
CPC ............ *H04L 51/10* (2013.01); *G06F 3/0481* (2013.01); *G06F 3/04847* (2013.01); *G06F 7/08* (2013.01); *G06F 40/134* (2020.01); *H04L 51/18* (2013.01); *G06F 3/167* (2013.01)

(58) Field of Classification Search
CPC ... H04L 51/10; G06F 3/0481; G06F 3/04847; G06F 3/167; G06F 7/08; G06F 17/2235
See application file for complete search history.

(56) References Cited

U.S. PATENT DOCUMENTS

| | | | |
|---|---|---|---|
| 8,566,152 B1 | 10/2013 | Shaw et al. | |
| 9,922,342 B2* | 3/2018 | Reis | G06Q 30/0269 |
| 2004/0044566 A1 | 3/2004 | Bostelmann et al. | |
| 2010/0017294 A1 | 1/2010 | Mancarella et al. | |

(Continued)

*Primary Examiner* — Viet D Vu
(74) *Attorney, Agent, or Firm* — Shook, Hardy & Bacon LLP (57) ABSTRACT

An interactive email experience is customized to the recipient's interests by modifying rich media components provided by the email based on the recipient's interactions with other rich media components from the email. To facilitate the interactive email experience, rich media components are provided by a marketer for an email campaign with mapping information mapping product features to portions of the rich media components. When an email is sent with links to the rich media components, the recipient's interactions with a rich media component is tracked. Product features are ranked based on the recipient's interactions with various portions corresponding with the various product features. The product feature rankings are then used to modify other rich media components from the email to emphasize portions of the other rich media components corresponding with product features of interest to the recipient.

19 Claims, 4 Drawing Sheets

(56) References Cited

U.S. PATENT DOCUMENTS

| | | | |
|---|---|---|---|
| 2010/0114720 A1* | 5/2010 | Jones | G06Q 30/0277 |
| | | | 705/14.73 |
| 2012/0158501 A1 | 6/2012 | Zhang et al. | |
| 2013/0097023 A1* | 4/2013 | Yerli | G06Q 30/0264 |
| | | | 705/14.61 |
| 2014/0006181 A1 | 1/2014 | Pisaris-Henderson | |
| 2014/0122227 A1 | 5/2014 | Reinshagen | |
| 2015/0025959 A1 | 1/2015 | Raghuveer | |
| 2015/0051981 A1* | 2/2015 | Ge | G06Q 30/0269 |
| | | | 705/14.66 |
| 2016/0292729 A1* | 10/2016 | Grunewald | G06Q 30/0255 |
| 2017/0178179 A1* | 6/2017 | Bauman | G06Q 30/0244 |

* cited by examiner

MODIFYING RICH MEDIA COMPONENTS FOR AN INTERACTIVE EMAIL

CROSS-REFERENCE TO RELATED APPLICATIONS

This application is a continuation of U.S. patent application Ser. No. 14/706,051, filed May 7, 2015, which is herein incorporated by reference in its entirety.

BACKGROUND

As customer demands for relevant experiences increase, marketers are under more pressure than ever before to produce personalized and effective content that delivers results. Some marketing tools, such as the ADOBE CAMPAIGN marketing tool, are available to help marketers target each contact with personalized and relevant communications. A customer may show interest in a particular product, for example, by visiting a marketer website or a FACEBOOK product page. Often, it's important for the marketer to contact this customer at the earliest time with a personalized message, such as an email or SMS message, in order to get a conversion (e.g., a product purchase). Marketing tools, such as the ADOBE CAMPAIGN marketing tool, provides marketers with the ability to automate this process by defining business rules that select and send the right message for this particular customer based on, for instance, the content viewed by the customer. For example, a marketer can define a business rule such that whenever a customer visits the marketer's website and views some web pages, an email is sent to the customer that contains a brief product description based on the types of web pages the customer visited at the marketer's website.

Email campaigns provided by marketing tools have gotten richer with the ability to include not only text but also rich media components, such as videos, audios (e.g., podcasts), image slideshows, and links to product pages and pages detailing various features of the product. When a customer receives an email via such an email campaign, the customer may interact with each of the rich media components. Traditionally, the rich media components are static in the sense that the rich media components included cannot be changed after they're provided to the customer.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention generally relate to dynamically modifying rich media components provided by an email marketing a product based on the recipient's interactions with other rich media components provided by that email. This provides a highly relevant and personalized experience to the recipient that may be accomplished irrespective of the order in which the recipient interacts with the various rich media components. In accordance with embodiments of the present invention, mapping information is stored that maps product features to various portions of rich media components available for an email campaign. When an email is sent as part of the email campaign, the email includes links to the rich media components. As the recipient interacts with a rich media component after receiving the email, the recipient's interactions with the rich media component are tracked and mapped to product features based on the mapping information. The various product features are ranked based on the recipient's interactions with the various portions, and other rich media components provided by the email are modified in order to emphasize portions of those rich media components corresponding with product features that have a higher ranking. As such, when the recipient accesses the other rich media components, the rich media components will be configured to emphasize product features relevant to the recipient's interests.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein:

A "marketing tool" refers to software that facilitates a marketer's communications with potential customers. Among other things, a marketing tool may be used by a marketer to send email messages to recipients as part of an email campaign promoting the marketer's product.

A "marketer" refers to an entity that markets one or more products or services. For instance, a marketer may be a company that manufactures, distributes, and/or sells a product or offers a service or an entity that markets such a company's product or service on behalf of the company.

The term "product" is used herein to refer not only to goods or merchandise but also includes services provided by a marketer.

A "product feature" refers to any aspect used to characterize a product. In some instances, a product feature is an aspect that may be used to compare or distinguish the product from other similar products.

An "email campaign" refers to the targeted delivery of email messages to recipients to market a product. The email messages may include text and provide access to one or more rich media components providing information regarding the product.

A "rich media component" comprises content that extends beyond plain text and may include videos, audios (e.g., podcasts), image slideshows, and/or links to product pages and pages detailing various features of a product. A rich media component may provide features that allow a user to interact with the rich media component (e.g., pausing a video, controlling progression through an image collection, etc.).

"Interaction information" includes information describing a user's interaction with a rich media component.

Marketing tools, such as the ADOBE CAMPAIGN marketing tool, assist marketers in targeting potential customers with email messages regarding products that are likely of interest to the customers. For instance, a marketer may employ a marketing tool to establish an email campaign such that an email message is sent to each customer who visits a product page at the marketer's website. The email messages may include not only text regarding the product from the visited product page but links to rich media components with which the customers may interact. While the interactivity of the rich media components increases customers' engagement, the rich media components are typically static in the sense that they cannot be modified once provided to a customer. In some instances, a customer may be interested in particular product features. While the rich media components may provide information regarding those particular product features, that information may be buried within information regarding other product features with which the customer has little or no interest.

Embodiments of the present invention are generally directed to techniques to dynamically modify rich media components for an email campaign in order to prioritize and better emphasize particular product features of interest to a given recipient. A marketing tool in accordance with embodiments of the present invention allows a marketer to provide not only rich media components for an email campaign but also mapping information that maps product features to portions of each rich media component. When an email message is sent to a recipient with links to rich media components, the recipient may choose to interact with a rich media component. The recipient's interactions with various portions of the rich media component are tracked and the product features of those portions may be identified from the mapping information. The product features are ranked based the recipient's interactions to reflect the recipient's interest in the various product features. The product feature rankings are then used to modify other rich media components linked to by the email message. For instance, portions of the rich media component may be ordered such that portions corresponding with product features with higher product feature rankings (and therefore higher relevance to the recipient's interests) are provided first. As such, when the recipient interacts with those other rich media components, the portions of the rich media components are presented in an order that attempts to match the recipient's interests. As the recipient continues to interact with rich media components, interaction information may continue to be tracked and used to rank product features and further modify the rich media components.

By modifying rich media components based on a recipient's interactions with other rich media components, embodiments provide a highly relevant and personalized experience in real-time to the recipient. This may be accomplished irrespective of the order in which the recipient interacts with the various rich media components of the email message. Such a highly relevant experience provides for higher engagement for a recipient, which in turn provides for higher probability of conversion by capitalizing on the likes and dislikes of the recipient within a given email campaign in real-time. Furthermore, because portions of a rich media component may be prioritized, the recipient may not need to consume the entire rich media component (e.g., the recipient may only watch the beginning of a video since those initial portions include what's relevant to that recipient) or portions that are not of interest to the recipient may simply be removed. Accordingly, resources, including but not limited to network bandwidth and processing time for servers delivering rich media contents, may be conserved.

Figure 1:
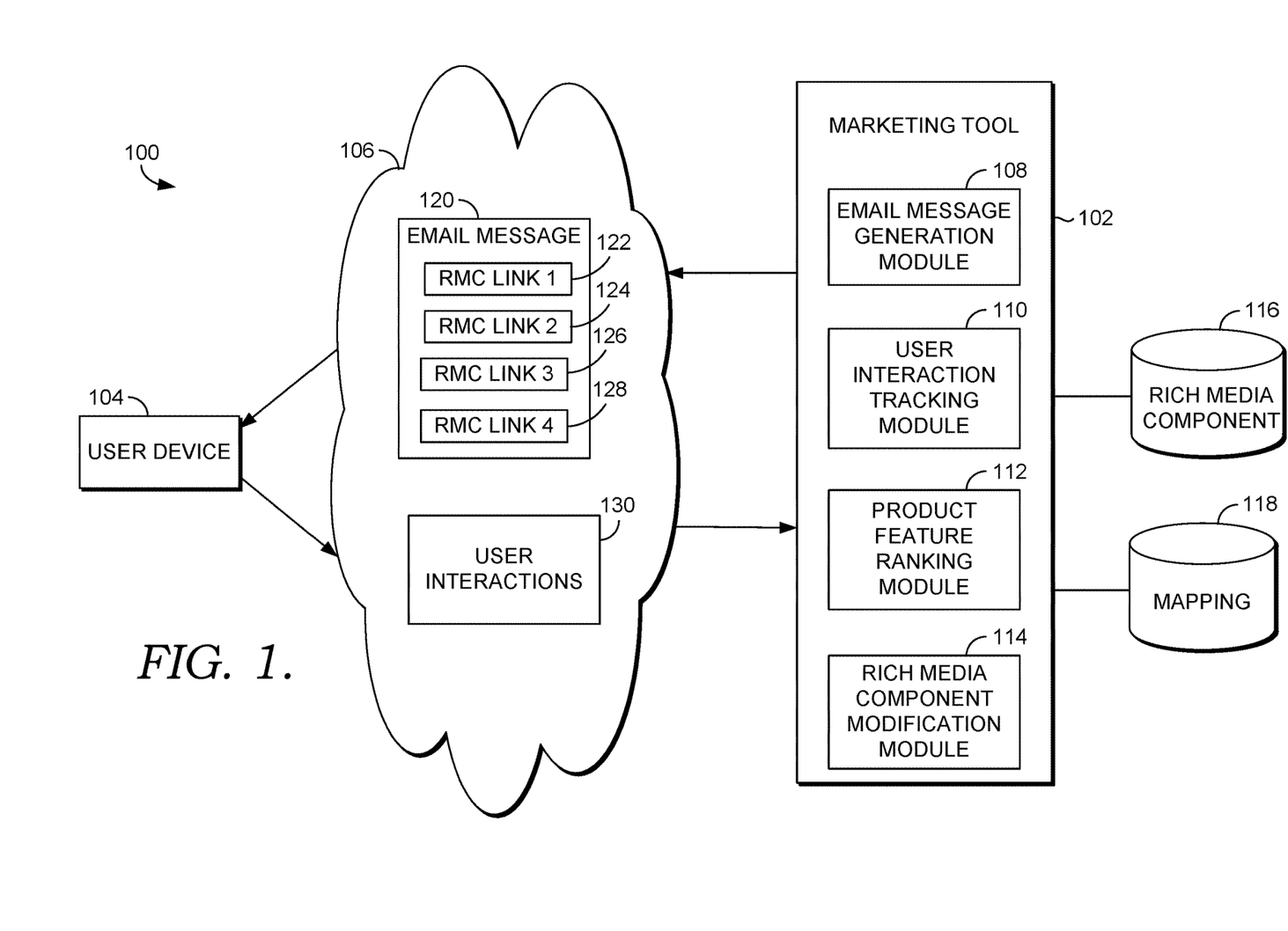
FIG. 1 is a block diagram showing a system for modifying rich media components for an email message based on user interactions with other rich media components from the email message in accordance with an embodiment of the present invention.

Turning now to FIG. 1, a block diagram is provided illustrating an exemplary system 100 in which some embodiments of the present invention may be employed. It should be understood that this and other arrangements described herein are set forth only as examples. Other arrangements and elements (e.g., machines, interfaces, functions, orders, and groupings of functions, etc. can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system in FIG. 1 includes a marketing tool 102 that is configured to, among other things, generate an email message 120 that includes a number of links to rich media components 122, 124, 126, 128. The email message is sent to a recipient's email address over a network 106 such that the recipient may access the email message, for instance, using the user device 104. As will be discussed in further detail below, the marketing tool 102 facilitates providing tracking user interactions 130 with rich media components and modifying rich media components based on preferences for particular product features demonstrated by the user interactions 130. The marketing tool 102 may be implemented via any type of computing device, such as computing device 400 described below with reference to FIG. 4, for example. The marketing tool 102 may be implemented on a single device or multiple devices cooperating in a distributed environment.

Initially, a marketer provides a variety of content and information for an email campaign. The content includes a variety of rich media components, such as streaming videos, streaming audios (e.g., podcasts), image collections (e.g., slideshows), and URLs to landing pages regarding the marketer's product. Additionally, the marketer provides information including product features for a given product and mapping information mapping the product features to various portions of the rich media components.

For a video or an audio, portions may correspond with timeline portions (e.g., 0-10 seconds, 10-25 seconds, 25-30 seconds, etc.). As such, information may be provided tagging portions of the timeline of the video or audio with product features. For example, if a video is directed to a trip to France, the timeline of the video could be tagged such that 0-12 seconds corresponds with the Eiffel Tower, 12-26 seconds corresponds to the Palace of Versailles, and 26-40 seconds corresponds to Mont Saint-Michel. Alternatively or additionally, a marketer may provide individual sub-videos or sub-audios, which are stand-alone videos or audios that may be combined to provide a video or audio for a particular email message. In such instances, each sub-video or sub-audio may be viewed as a portion. As such, each sub-video or sub-audio may be identified as corresponding with one or more product features. For instance, a sub-video could be provided for the Eiffel Tower, another sub-video could be provided for the Palace of Versailles, and still another sub-video could be provided for the Mont Saint-Michel.

For an image collection (e.g., slideshow), each image may represent a portion of the image collection. Metadata may be provided with each image that identifies one or more product features associated with the image. For example, continuing the trip to France example above, images of the Eiffel Tower could be tagged as corresponding with the Eiffel Tower, while images from the Palace of Versailles could be tagged as corresponding with the Palace of Versailles.

For each URL provided, the product features discussed on each landing page associated with each URL may be identified and mapped to the URL. In some instances, portions of each landing page (e.g., regions of text, images, or other content) may be analyzed and identified as corresponding with particular product features.

The rich media components provided by the marketer may be stored in a rich media component database 116. As noted above, the rich media components may include streaming videos, streaming audio, image collections, and URLs of landing pages. Additionally, mapping information mapping product features to various portions of the rich media components may be stored in a mapping data store 118. While only a single rich media component database 116 and mapping data store 118 are shown in FIG. 1, it should be understood that any number of rich media component databases and mapping data stores may be provided. Additionally, while the rich media component database 116 and mapping data store 118 are shown separately in FIG. 1, it should be understood that a common data structure may be provided to store the rich media components and mapping information.

The rich media components and mapping information are associated with a particular email campaign, which is identified with a unique campaign ID. As such, email messages containing links to rich media components may be generated and sent to recipients as part of the email campaign. In particular, the marketing tool 102 includes an email message generation module 108 that is configured to generate email messages. Each email may contain text and links to rich media components and may be sent to email addresses of targeted recipients. For instance, FIG. 1 illustrates an email message 120 that has been generated to include four rich media component links 122, 124, 126, 128 and that is sent to a recipient's email address such that the recipient may receive the email message, for instance, on the user device 104. The rich media component links 122, 124, 126, 128 included in the email message 120 may be, for instance, a link to a streaming video, a link to a streaming audio, a link to an image collection, and a link to one or more landing pages.

A unique user ID may be generated for the email message 120, and the unique user ID (an in some cases, the unique campaign ID) may be embedded in each of the rich media component links 122, 124, 126, 128. This is to ensure that when the recipient clicks on various links to access corresponding rich media components, the marketing tool 102 can identify the user and/or the campaign. As shown in FIG. 1, the marketing tool 102 includes a user interaction tracking component 110. The user interaction tracking component 110 is configured to track user interactions 130 with the various rich media components. In the case of a streaming video or audio, user interaction information tracked includes, for instance, portions viewed, paused, rewound, zoomed, skipped, and fast forwarded. As discussed previously, a portion of a video or audio may include a timeline portion and/or a sub-video or sub-audio in the event the video or audio is generated from multiple sub-videos or sub-audios.

In the case of an image collection (e.g., an image slideshow), user interaction information tracked includes, for instance, images viewed, time spent viewing each image, and number of times each image was viewed. As previously discussed, a portion of an image collection corresponds with each image.

In the case of a URL, user interaction information tracked includes portions of a landing page viewed and length of time each portion was viewed. As noted previously, portions of a landing page corresponds with particular content portions rendered. In some configurations, this tracking is done using JavaScript/jQuery on any web page and within an app. For instance, given a current scroll position, the content being rendered can be determined. Time spent at a particular scroll position may also be tracked to determine the time the recipient spent viewing the rendered content corresponding with that scroll position.

In some configurations, eye-tracking technology may be used to track what portions of the landing page the recipient views and the time spent viewing each portion. A number of eye-tracking technologies are available that measure a point of gaze (e.g., where a person is looking) and/or the motion of an eye relative to a person's head. By way of example only and not limitation, the content of a landing page viewed may be determined using eye tracking by assuming that the person is reading a given page on an article containing predominantly horizontal text. Using an eye tracking tool, the number of fixations on the page and (x,y) coordinates of fixation may be determined. Fixation time can vary from 100 ms to 500 ms with average of 250 ms. Based upon (x,y) coordinates of fixations, an algorithm may be employed to determine DELTA Y & DELTA X for every two consecutive fixations (e.g., DELTA Y=I Y2−Y1 I & DELTA X=I X2−X1 I). When the person is reading horizontally DELTA X will be above a threshold & DELTA Y will be smaller or close to zero. Hence, the regions with high concentration of fixations may be determined.

A product feature ranking module 112 determines the importance of the various product features to the recipient based on the user interaction with one or more of the rich media components. Generally, the product feature ranking component 112 ranks at least a portion of the product features by using the mapping information stored in the mapping data store 118 to identify product features corresponding with each portion of a rich media component with which the recipient interacted and ranking the product features based on the specific user interaction with each portion.

In the case of user interactions with a streaming video or audio, product features associated with each portion with which the recipient interacted are identified based on timeline tagging or sub-video/sub-audio tagging, and those identified product features are ranked based on the type of user interaction with each corresponding portion. For instance, product features corresponding with portions of a video or audio the recipient viewed, replayed, paused on, zoomed, or otherwise positively engaged with are given a higher ranking. Conversely, product features corresponding with portions of a video or audio the user skipped or other otherwise negatively engaged with are given a lower ranking.

In the case of user interactions with an image collection, product features corresponding with images with which the recipient interacted are identified based on metadata associated with the images, and the product features are ranked based on the type of user interaction with each corresponding image. The ranking of product features may be determined based on whether the recipient viewed a corresponding image, the time spent viewing a corresponding image, and/or the number of times a corresponding image was viewed. For instance, a first product feature corresponding with a first image that was viewed twice for a longer period of time may be given a higher ranking than a second product feature corresponding with a second image that was viewed once for a shorter period of time. The ranking of a product feature corresponding with a skipped image may be decreased based on such interaction.

In the case of user interactions with a landing page, product features associated with portions of the landing page with which the recipient interacted are identified, and the product features are ranked based on the user interactions. In some configurations, mapping information is available in the mapping data store 118 that maps product features to various portions of the landing page. In such configurations, the mapping information may be employed. Additionally or alternatively, the portions of the landing page with which the recipient interacted may be processed using, for instance, a natural language processing (NLP) engine to identify product features associated with those portions. For instance, known NLP techniques can be leveraged to identify important keywords in various portions of the landing page. Keywords include the important topics in the content. For example, a part of speech tagger may be used to identify nouns and proper nouns and the relevance of those words to the content. Based on this analysis, important keywords may be identified from the content and mapped to product features for the marketer's product.

The ranking of a product feature from a landing page may be impacted based on whether a portion of the landing page containing the product feature was viewed, how many times the portion was viewed, and the length with which the portion was viewed. For instance, a first product feature corresponding with a first portion of a landing page that was viewed for a longer period of time by the recipient would receive a higher ranking than a second product feature corresponding with a second portion of the landing page that was just skimmed over by the recipient.

Figure 2:
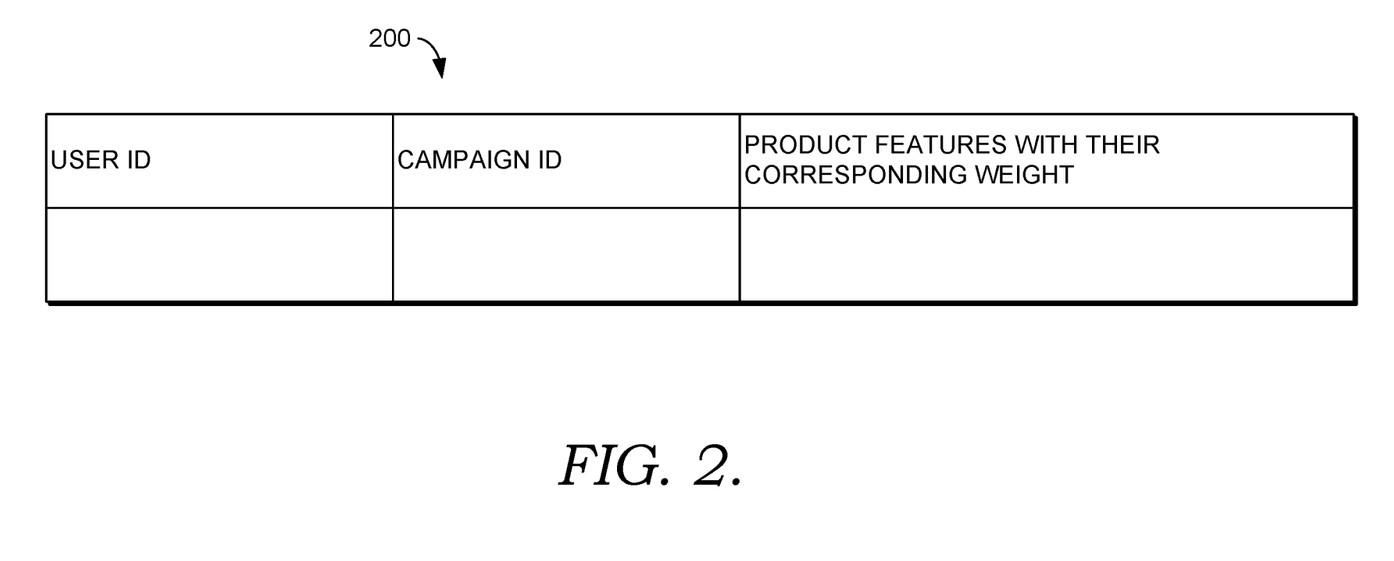
FIG. 2 is a diagram showing an table for tracking product feature weights based on user interactions with rich media components in accordance with an embodiment of the present invention.

In some configurations, product feature rankings are tracked by assigning a weight to each product feature and changing the weight for product features as the recipient interacts with various portions of a rich media component. For instance, the weight for each product feature may initially be set to 1. As the user interacts with a rich media component, the weight for each product feature may be increased or decreased based on the user interactions. For instance, a user viewing and/or spending more time viewing a portion of a rich media component corresponding with a particular product feature causes the weight for that product feature to the increased. Conversely, a user skipping over a portion of a rich media component corresponding with a particular product feature causes the weight for that product feature to be decreased. Accordingly, the user interactions with the rich media component causes the weights for some product features to be increased while the weights for other product features to be decreased, resulting in a range of weights representing the rankings for the various product features. By way of illustration, FIG. 2 illustrates a table 200 for tracking the weights by matching the unique campaign ID and/or unique user ID with the product feature weights. The weights in the table 200 are updated as the recipient interacts with the rich media component.

Product feature rankings represent the level of the recipient's interests in various product features based on the recipient's interactions with one or more of the rich media components. Other rich media components subsequently accessed by the recipient from the email message 120 are modified based on the product feature rankings in order to emphasize portions of the subsequently-accessed rich media components corresponding with the product features of interest to the recipient. As shown in FIG. 1, the marketing tool 102 includes a rich media component modification module 114. The rich media component modification module 114 generally operates to reorder, remove, and/or add portions to a rich media component based on product feature rankings.

For a streaming video or audio, the video or audio may be rearranged to focus on portions corresponding with product features of interest to the recipient based on the product feature rankings. In configurations in which a single video or audio is provided, the server serving the video or audio is configured to jump to various portions of the video or audio in a particular order determined based on product feature rankings and portions of the video or audio associated with various product features (e.g., as set forth in the mapping information stored in the mapping data store 118). For instance, suppose a video directed to a trip to France has been tagged such that 0-12 seconds corresponds with the Eiffel Tower, 12-26 seconds corresponds to the Palace of Versailles, and 26-40 seconds corresponds to Mont Saint-Michel. Further suppose that based on the recipient's interaction with another rich media component, the product feature rankings indicate a highest ranking for the Palace of Versailles, a second highest ranking for the Eiffel Tower, and a lowest ranking for the Mont Saint-Michel. Based on the product feature rankings, when the recipient accesses the link to the video, the video is streamed such that the portion from 12-26 seconds (corresponding to the Palace of Versailles) is streamed first, followed by the portion from 0-12 seconds (corresponding to the Eiffel Tower), and then followed by the portion from 26-40 seconds (corresponding with the Mont Saint-Michel). If sub-video or sub-audio portions are provided, the video or audio is configured by ordering the sub-video or sub-audio portions based on the product feature rankings and the product features corresponding with each sub-video or sub-audio portion. Continuing the example above a sub-video corresponding with the Palace of Versailles would be followed by a sub-video corresponding with the Eiffel Tower, followed by a sub-video of the Mont Saint-Michel.

For image collections, images may be selected and ordered for presentation based on product feature rankings. For example, continuing the example in which the product feature rankings based on the recipient's interaction with another rich media component indicate a highest ranking for the Palace of Versailles, a second highest ranking for the Eiffel Tower, and a lowest ranking for the Mont Saint-Michel, an image collection may be generated by providing images of the Palace of Versailles first, followed by images of the Eiffel Tower, and then followed by images of the Mont Saint-Michel.

For URL links to landing pages, the landing pages to which each link is directed may be configurable such that the landing pages to which the recipient is directed is based on the product feature rankings such that the recipient accesses landing pages that are of interest to the recipient. For instance, each link included in the email message 120 may be directed to an initial proxy server, which may be operable to configurably redirect to a particular landing page. As such, the landing page may be selectably changed at the proxy server based on product feature rankings such that the recipient is directed to a landing page that has higher relevance to the recipient's interests. As a specific example, suppose the product feature rankings indicate a highest ranking for the Palace of Versailles. As such, the proxy server could be configured to redirect to a landing page specifically directed to the Palace of Versailles.

Figure 3:
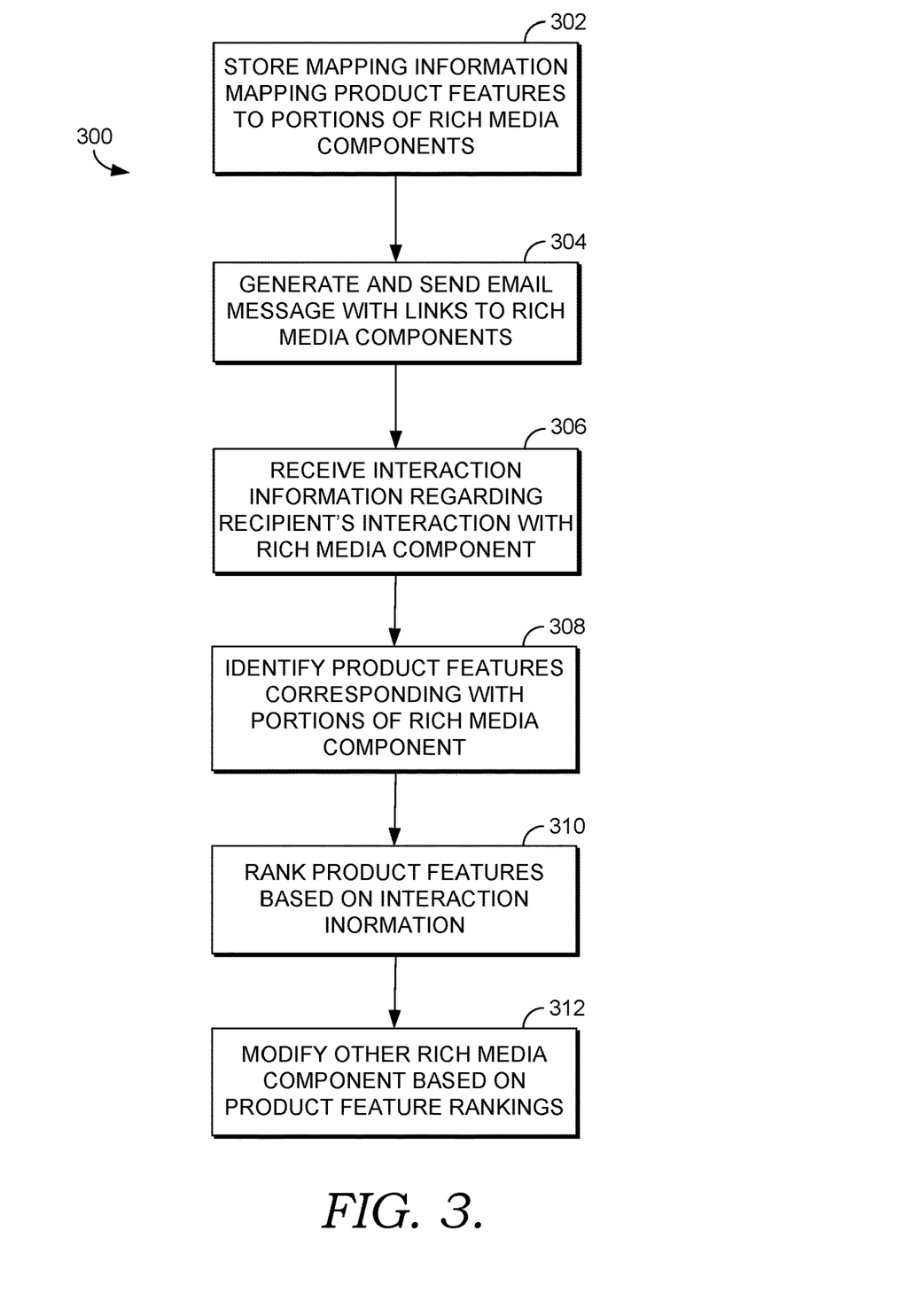
FIG. 3 is a flow diagram showing a method for modifying a rich media component based user interactions with another rich media component from an email message in accordance with embodiments of the present invention.

With reference now to FIG. 3, a flow diagram is provided that illustrates a method 300 for modifying a rich media component from an email message based on user interactions with another rich media component from the email message. Each block of the method 300 comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 300 may be provided as part of a marketing tool, such as the marketing tool 102 of FIG. 1.

Initially, as shown at block 302, mapping information that maps product features to portions of rich media components are stored. For instance, a marketer may provide rich media components for an email campaign, identify relevant product features, and provide information mapping the various product features to portions of the rich media components. As noted above, the rich media components may include, for instance, videos, audios, image collections, and/or URLs of landing pages relevant to the product.

As shown at block 304, an email message is sent to a recipient. For instance, a marketing tool may have business rules for an email campaign that trigger sending an email message to potential customers in response to various activities, such as the customers visiting a product page on the marketer's website or social media page (e.g., a FACEBOOK page). The email message may include text regarding a particular product the recipient is likely interested in and links to rich media components regarding the product.

After the recipient receives the email message, the recipient may choose to interact with one or more of the rich media components. As shown at block 306, the recipient interacts with a first rich media component, and interaction information regarding the recipient's interaction with that rich media component is received. The interaction information may include, for instance, viewing, interacting with, or skipping portions of a video, audio, image collection, or landing page of a link.

Product features corresponding with portions of the first rich media component with which the recipient interacted are determined, as shown at block 308. This may be determined by identifying portions with which the recipient interacted and looking up product features associated with those portions in the mapping information stored at block 302. In the case of the first rich media component being a landing page, portions of the landing page may be analyzed using natural language processing to identify product features associated with each portion.

The product features are ranked based on the interaction information, as shown at block 310. For instance, the ranking may be increased for product features corresponding with portions of the first rich media component with which the recipient interacted in a manner that indicates interest in those portions (e.g., viewing, viewing multiple times, longer time spent viewing, etc.). Alternatively, the ranking may be decreased for product features corresponding with portions of the first rich media component with which the recipient interacted in a manner that indicates a lack of interest in those portions (e.g., skipping over, shorter time spent viewing, skimming over, etc.).

As shown at block 312, at least one other rich media component linked to by the email message is modified based on the product feature rankings. In particular, portions of the other rich media component may be ordered in accordance with the product feature rankings to place portions corresponding with product features with higher rankings first. In some instances, portions may be removed (i.e., portions corresponding with product features having a lower ranking) and/or portions may be added (i.e., portions corresponding with product features having a higher ranking). As such, when the recipient accesses the other rich media component from the email message, the other rich media component will be customized to the recipient's interests that were evidenced by the recipient's interactions with the first media component.

Figure 4:
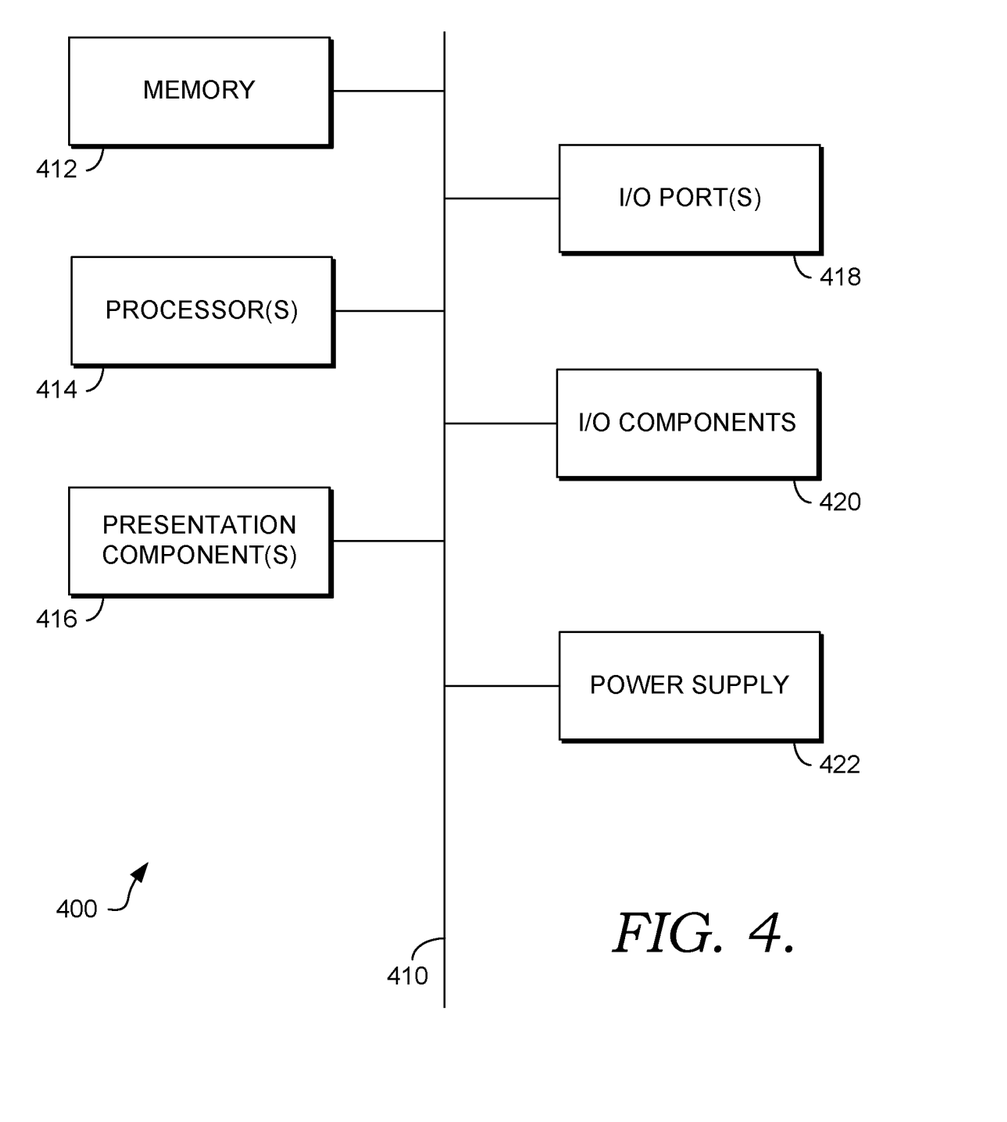
FIG. 4 is a block diagram of an exemplary computing environment suitable for use in implementing embodiments of the present invention.

Having described embodiments of the present invention, an exemplary operating environment in which embodiments of the present invention may be implemented is described below in order to provide a general context for various aspects of the present invention. Referring initially to FIG. 4 in particular, an exemplary operating environment for implementing embodiments of the present invention is shown and designated generally as computing device 400. Computing device 400 is but one example of a suitable computing environment and is not intended to suggest any limitation as to the scope of use or functionality of the invention. Neither should the computing device 400 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 4, computing device 400 includes a bus 410 that directly or indirectly couples the following devices: memory 412, one or more processors 414, one or more presentation components 416, input/output (I/O) ports 418, input/output components 420, and an illustrative power supply 422. Bus 410 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 412 includes computer-storage media in the form of volatile and/or nonvolatile memory. The memory may be removable, non-removable, or a combination thereof. Exemplary hardware devices include solid-state memory, hard drives, optical-disc drives, etc. Computing device 400 includes one or more processors that read data from various entities such as memory 412 or I/O components 420. Presentation component(s) 416 present data indications to a user or other device. Exemplary presentation components include a display device, speaker, printing component, vibrating component, etc.

I/O ports 418 allow computing device 400 to be logically coupled to other devices including I/O components 420, some of which may be built in. Illustrative components include a microphone, joystick, game pad, satellite dish, scanner, printer, wireless device, etc. The I/O components 420 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 400. The computing device 400 may be equipped with depth cameras, such as, stereoscopic camera systems, infrared camera systems, RGB camera systems, and combinations of these for gesture detection and recognition. Additionally, the computing device 400 may be equipped with accelerometers or gyroscopes that enable detection of motion. The output of the accelerometers or gyroscopes may be provided to the display of the computing device 400 to render immersive augmented reality or virtual reality.

As can be understood, embodiments of the present invention dynamically modify rich media components provided via an email based on the recipient's interactions with other rich media components provided by that email. This allows for a customized experience that automatically identifies the recipient's interests and personalizes the rich media components based on those interests. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   sending an email message to a recipient, the email message containing links to a plurality of pre-existing rich media components, each rich media component comprising content about a product that is presented to the recipient upon selection of a corresponding link in the email message;
   receiving interaction information regarding the recipient interacting with a first rich media component from the plurality of pre-existing rich media components; and
   modifying content within a second rich media component from the plurality of pre-existing rich-media components based on the interaction information.

2. The one or more computer storage media of claim 1, wherein the operations further comprise ranking a plurality of product features of the product based on the interaction information to provide product feature rankings; and wherein modifying the content within the second rich media component based on the interaction information comprises modifying the content within the second rich media component based on the product feature rankings.

3. The one or more computer storage media of claim 2, wherein a first product feature is ranked by:
   identifying, from the interaction information and mapping information mapping the product features to portions of the first rich media component, one or more specific interactions with one or more portions of the first rich media component corresponding with the first product feature; and ranking the first product feature based on the specific interactions with the one or more portions of the first rich media component corresponding with the first product feature.

4. The one or more computer storage media of claim 2, wherein ranking the plurality of product features based on the interaction information comprises:

accessing mapping information mapping the plurality of product features to portions of the first rich media component; and ranking the plurality of product features based on interactions with portions of the first rich media component identified by the interaction information.

5. The one or more computer storage media of claim 2, wherein the product features are ranked by initializing a weight for each product feature to an initial weight and modifying the weight for each of at least a portion of the product features based on the interaction information.

6. The one or more computer storage media of claim 5, wherein the weight for a first product feature is modified based on a type of interaction with one or more portions of the first rich media component corresponding with the first product feature.

7. The one or more computer storage media of claim 2, wherein the first rich media component comprises a collection of images, and wherein ranking the plurality of product features based on the interaction information comprises:

accessing mapping information mapping the plurality of product features to images within the collection of images; and ranking the plurality of product features based on interactions with images within the collection of images identified by the interaction information.

8. The one or more computer storage media of claim 2, wherein the first rich media component comprises one or more links to one or more webpages, and wherein ranking the plurality of product features based on the interaction information comprises:

determining product features corresponding with at least a portion of the one or more webpages viewed by the recipient as set forth by the user interaction information; and ranking the plurality of product features based on interactions with the at least the portion of the one or more webpages viewed by the recipient as set forth by the interaction information.

9. The one or more computer storage media of claim 2, wherein modifying the content of the second rich media component comprises reordering portions of the second rich media component based on the product feature rankings using mapping information mapping the portions of the second rich media component to the product features.

10. The one or more computer storage media of claim 2, wherein the second rich media component comprises an image collection, and wherein modifying the content within the second rich media component comprises reordering images within the image collection based on the product feature rankings.

11. The one or more computer storage media of claim 1, wherein the content within the second rich media component is modified by at least one selected from the following: reordering one or more portions of the second rich media component;

removing one or more portions of the second rich media component; and adding new content to the content within the second rich media component.

12. A computerized method for personalizing an interactive email campaign, the computerized method comprising:

storing, via a first computing process, mapping information mapping product features to portions of rich media components for the interactive email campaign;

sending, via a second computing process, an email message to a recipient, the email message containing links to the rich media components, each rich media component comprising content about a product that is presented to the recipient upon selection of a corresponding link in the email message;

receiving, via a third computing process, user interaction information regarding the recipient interacting with portions of a first rich media component;

using, via a fourth computing process, the mapping information to identify product features corresponding with the portions of the first rich media component with which the recipient interacted based on the user interaction information; and modifying, via a fifth computing process, content within a second rich media component by reordering portions of the content within the second rich media component corresponding with the product features identified by the fourth computing process;

wherein the first, second, third, fourth, and fifth computing processes are performed by one or more computing devices.

13. The computerized method of claim 12, wherein the second rich media component is modified by:

ranking the product features corresponding with the portions of the first rich media component with which the recipient interacted based on one or more specific interactions with each of the portions of the first rich media component with which the recipient interacted to provide product feature rankings; and modifying the content within the second rich media component by reordering the portions of the second rich media component based on the product feature rankings.

14. The computerized method of claim 13, wherein the portions of the second rich media component are reordered by:

identifying product features corresponding with each of the portions of second rich media component based on mapping information available for the second rich media component; and reordering the portions of the second rich media component based on product feature rankings of product features corresponding with the portions of the second rich media component.

15. A computerized system comprising:

a datastore storing mapping information mapping portions of rich media components to product features;

one or more processors; and one or more computer storage media storing computer-useable instructions that, when used by the one or more processors, cause the one or more processors to:

send an email message to a recipient, the email message containing links to the rich media components, each rich media component comprising content about a product that is presented to the recipient upon selection of a corresponding link in the email message;

receive interaction information regarding the recipient interacting with portions of a first rich media component;

identify product features corresponding with the portions of the first rich media component based on the mapping information;

rank the product features based on the interaction information to provide product feature rankings; and modify content within a second rich media component based on the product feature rankings.

16. The system of claim 15, wherein the product features are ranked by initializing a weight for each product feature to an initial weight and modifying the weight for each of at least a portion of the product features based on the user interaction information.

17. The system of claim 15, wherein the content within the second rich media component is modified by reordering portions of the second rich media component.

18. The system of claim 15, wherein the content within the second rich media component is modified by removing one or more portions of the second rich media component.

19. The system of claim 15, wherein the content within the second rich media component is modified by adding new content to the content within the second rich media component.

* * * * *